(12) United States Patent
Lee et al.

(10) Patent No.: US 6,687,011 B1
(45) Date of Patent: Feb. 3, 2004

(54) TRANSMISSION-TYPE EXTRINSIC FABRY-PEROT INTERFEROMETRIC OPTICAL FIBER SENSOR

(75) Inventors: Jung Ju Lee, Taejun (KR); San Hoon Kim, Gunpo-si (KR); Dong Chun Lee, Taejun (KR); Il Bum Kwon, Taejun (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/469,756

(22) Filed: Dec. 22, 1999

(30) Foreign Application Priority Data

Apr. 23, 1999 (KR) ......................... 1999-14611

(51) Int. Cl.[7] .................................. G01B 9/02
(52) U.S. Cl. ................. 356/480; 356/519; 356/35.5; 356/506
(58) Field of Search ................. 356/506, 480, 356/35.5, 519, 478

(56) References Cited

U.S. PATENT DOCUMENTS

| | | | |
|---|---|---|---|
| 5,301,001 A | 4/1994 | Murphy et al. | 356/35.5 |
| 5,392,117 A | 2/1995 | Belleville et al. | 356/345 |
| 6,097,478 A | * 8/2000 | Berthold et al. | 356/35.5 |

OTHER PUBLICATIONS

*A Study on the Development of Transmission–Type Extrinsic Fabry–Perot Interferometric Optical Fiber Sensor and Its Application*; Dec. 29, 1998.
*A Study on the Development of Transmission–Type Extrinsic Fabry–Perot Interferometric Optical Fiber Sensor and Its Application*, Sang Hoon Kim et al., Journal of Lightwave Technology, vol. 17, No. 10, Oct. 1999.
*Fiber optic strain gauge*, Butter, C.D. et al. Applied Optics, vol. 17, pp. 2867–2869, 1978.
*Fibre optic strain gauge linerarization*; Odman, S. et al., Smart Materials and Structures, vol. 4, pp. 134–138, 1995.
*Damage monitoring of carbon fiber–reinforced plastics with Michelson interferometric fiber–optic sensors*, Tsuda, H. et al., Journal of Material Science, vol. 34, pp. 4163–4172, 1999.
*Simultaneous sensing of the strain and points of failure in composite beams with an embedded fiber optic Michelson sensor*; Kwon, I.B. et al.; Composites Science and Technology; vol. 57, pp. 1639–1651, 1997.

(List continued on next page.)

*Primary Examiner*—Frank G. Font
*Assistant Examiner*—Andrew H. Lee
(74) *Attorney, Agent, or Firm*—Graybeal Jackson Haley LLP

(57) ABSTRACT

A transmission-type extrinsic Fabry-Perot interferometric optical fiber sensor and a method used for integrity monitoring of structures and measuring strain and temperature are provided. The transmission-type extrinsic Fabry-Perot interferometric optical fiber sensor includes first single-mode optical fiber and second single-mode optical fiber, laser device, and optical detector. The first single-mode optical fiber is inserted into an end of a capillary quartz-glass tube and the second single-mode optical fiber is inserted into the other end of the capillary quartz-glass tube. Air gap is formed between the first single-mode optical fiber and the second single-mode optical fiber in the capillary quartz-glass tube. Gap length of the air gap changes in response to magnitude and direction of transformation of the capillary quartz-glass tube. The laser device launches light into an end of the first single-mode optical fiber. The end of the first single-mode optical fiber is not inserted into the capillary quartz-glass tube. The optical detector detects interferometric fringe of light. The light is launched from the laser device and passed through the first single-mode optical fiber, the air gap, and the second single-mode optical fiber. The number of occurrence of the interferometric fringe and trend of signal level are determined by change of the gap length.

6 Claims, 7 Drawing Sheets

OTHER PUBLICATIONS

*Composite material embedded fiber–optic Fabry–Perot strain rosette*; Valis, T. et al.; SPIE Fiber Optic Smart Structures and Skins III, vol. 1370, pp. 154–161, 1990.

*Optical fiber sensing technique for edge–induced and internal dalamination detection in composites*; Bhatia, V. et al.; Smart Materials and Structures, vol. 4, pp. 164–169, 1995.

*High resolution, wavelength–divsion–multiplexed in–fibre Bragg grating sensor system*; Y.J. et al.; Electronics Letters, vol. 32, Issue 10, pp. 924–926, 1996.

*Fatigue damage detection in carbon fibre reinforced composites using an intensity based optical fibre sensor*, Babcock, R.A. et al.; Proceedings of Smart Structures and Materials 1995: Smart Sensing Processing and Instrumentation SPIE, Vol 244,pp. 422–431, 1995.

*Quadrature phase–shifted, extrinsic Fabry–Perot optical fiber sensors*; Murphy, K.A. et al.; Optics Letters, vol. 16, No. 4, pp. 273–275, 1991.

*Multiple strain state measurements using conventional and absolute optical fiber–based extrinsic Fabry–Perot interferometric strain sensors*; Bhatia, V. et al.; Smart Marterials and s tructdures, vol. 4, pp. 240–245, 1995.

*Interference effects in optical fiber connections*; Applied Optics, Vol 21, No. 8, pp. 1381–1385, 1982.

*Loss Analysis of Single–Mode fiber splices*; Marcuse, d., The Bell System Technical Journal, vol. 56, No. 5, pp. 703–718, 1977.

* cited by examiner

TRANSMISSION-TYPE EXTRINSIC FABRY-PEROT INTERFEROMETRIC OPTICAL FIBER SENSOR

TECHNICAL FIELD

The present invention relates to a transmission-type extrinsic Fabry-Perot interferometric optical fiber sensor. In particular, the present invention relates to a transmission-type extrinsic Fabry-Perot interferometric optical fiber sensor and a method, which can be used for integrity monitoring of structures and measuring strain and temperature.

BACKGROUND OF THE INVENTION

Generally, optical fiber sensors have small size. Therefore, it is relatively easy to attach the sensors on the surface of objects to be measured and insert the sensors into composite material. In addition, the sensors have high durability and anti-corrosive capability and are not affected by electromagnetic wave. Especially, interferometric optical fiber sensors have high resolution and sensitivity and therefore they are quite useful to monitor integrity of machine structures and building structures caused by unexpected impact and longtime usage.

The optical fiber sensors include interferometric sensors, spectrum analysis-based sensors, and intensity-based sensors. Interferometric sensors are cheaper than spectrum analysis-based sensors and it is simpler to build systems with interferometric sensors than with spectrum analysis-based sensors. Interferometric sensors are more sensitive than intensity-based sensors. There are Mach-Zender interferometers, Michelson interferometers, and Fabry-Perot interferometers in the category of interferometric sensors.

Optical fiber sensors based upon Mach-Zender interferometers and Michelson interferometers are easily affected by external disturbances because they includes reference optical fiber. On the contrary, optical fiber sensors based upon Fabry-Perot interferometers provide light with only one optical fiber and therefore they are not significantly affected by external disturbances. Optical fiber sensors based upon Fabry-Perot interferometers are categorized by medium in which interferometry is occurred. If the medium is optical fiber, the optical fiber sensor is called intrinsic. If the medium is air, the optical fiber sensor is called extrinsic. Extrinsic Fabry-Perot Interferometric (EFPI) sensors are easier to fabricate than intrinsic Fabry-Perot Interferometric (IFPI). And extrinsic Fabry-Perot Interferometric (EFPI) sensors have superior mechanical characteristics to intrinsic Fabry-Perot Interferometric (IFPI).

FIG. 1 is a diagram illustrating internal structure of conventional extrinsic Fabry-Perot optical sensor.

Generally, refractive index ($n_1$) of optical fibers is 1.46 and refractive index ($n_2$) of air is about one. Due to the difference of the refractive index ($n_1$) of optical fibers and the refractive index ($n_2$) of air, partial reflection is occurred at the boundary between core of the optical fiber and the air. Following equation 1 shows mathematical equation to calculate power reflection factor and power transmission factor.

$$\text{power reflection factor, } R = r^2 = \left[\frac{n_1 - n_2}{n_1 + n_2}\right]^2 \approx 3\% \quad \text{[Equation 1]}$$

$$\text{power transmission factor, } T = \left(\frac{n_2}{n_1}\right)t^2 = \frac{4n_1 n_2}{(n_1 + n_2)^2} \approx 97\%$$

As shown in FIG. 1, $I_{in}$, light propagating through single-mode fiber 11 (SMF), is divided into two at the boundary between the single-mode fiber 11 and air. That is, the first reflected light ($I_{out1}$), 3% of $I_{in}$, is reflected on the first boundary face between the single-mode fiber 11 and air and propagates toward the reverse direction through core of the single-mode fiber 11.97% of $I_{in}$ is transmitted into air gap, and then propagates back to core the single-mode fiber 11 after reflected on the second boundary between the multi-mode fiber 12 (MMF) and air. This is the second reflected light ($I_{out2}$)

Path difference of 2s (s: gap length) is generated between the first reflected light ($I_{out1}$) and the second reflected light ($I_{out2}$). Interference caused by the Path difference is observed at optical receiver. The reflection paths except the first reflected light ($I_{out1}$) and the second reflected light ($I_{out2}$) can be ignored because they are very small.

$$I = I_0\{1 + \cos 2ks\} \quad \text{[Equation 2]}$$

k: propagation constant, $2\pi/\lambda$.
$\lambda$: wavelength of light source

The optical receiver receives the first reflected light ($I_{out1}$) and the second reflected light ($I_{out2}$). As the gap length varies, the first reflected light ($I_{out1}$) and the second reflected light ($I_{out2}$) cause change of phase difference. That is, as the gap length changes, the number of interferometric fringe changes. Therefore, if the number of interferometric fringe is known, variance of the gap length can be known ($\Delta s$). At the moment, because resolution is equal to a quarter of wavelength of 10 light source, helium-neon laser ($\lambda$=633 nm) or laser diode ($\lambda$=1300,1550 nm) are used as a light source for high resolution.

Even though being able to measure changes in single direction, the extrinsic Fabry-Perot interferometric sensors are problematic to measure physical quantity whose direction is varying. To compensate such problem,. Murphy, K. A., Gunther, M. F., Vengsarkar, A. M. and Claus, R. O. proposed a method at "Quadrature Phase-Shifted Extrinsic Fabry-Perot Optical Fiber Sensors", Optics Letters Vol. 16, No. 4, pp. 273~275, in 1991. The method includes Quadrature phase-shift EFPI sensors, which employ two extrinsic Fabry-Perot interferometric optical fiber sensors for detecting moving position. However, they are not efficient in that two sets of light source and optical receiver are required and changes of direction are continuously monitored.

In "Multiple strain state measurements using conventional and absolute optical fiber-based extrinsic Fabry-Perot interferometric strain sensors", Smart Materials and Structures, Vol. 4, pp. 240~245, 1995, Bhatia, V., Murphy, K. A., Claus, R. O., Jones, M. E., Grace, J, L., Tran, T. A., and Greene, J. A., absolute EFPI, performing absolute measurement through spectrum analysis, is disclosed.

Though the absolute EFPI uses interferometric fringe to perform absolute measurement, it is appropriate only for quasi-static measurement because of scanning time required by spectrum analyzers.

SUMMARY OF THE INVENTION

A transmission-type extrinsic Fabry-Perot interferometric optical fiber sensor and a method used for integrity monitoring of structures and measuring strain and temperature are provided.

The transmission-type extrinsic Fabry-Perot interferometric optical fiber sensor includes first single-mode optical fiber and second single-mode optical fiber, laser device, and optical detector.

The first single-mode optical fiber is inserted into an end of a capillary quartz-glass tube and the second single-mode optical fiber is inserted into the other end of the capillary quartz-glass tube. Air gap is formed between the first single-mode optical fiber and the second single-mode optical fiber in the capillary quartz-glass tube. Gap length of the air gap changes in response to magnitude and direction of transformation of the capillary quartz-glass tube.

The laser device launches light into an end of the first single-mode optical fiber. The end of the first single-mode optical fiber is not inserted into the capillary quartz-glass tube.

The optical detector detects interferometric fringe of light. The light is projected from the laser device and passed through the first single-mode optical fiber, the air gap, and the second single-mode optical fiber. The number of occurrence of the interferometric fringe and trend of signal level are determined by change of the gap length.

Desirably, the gap length is decreased and signal level is increased when the capillary quartz-glass tube is compressible-transformed in length direction. The gap length is increased and signal level is decreased when the capillary quartz-glass tube is tensile-transformed in length direction. The signal level is middle value between peak and valley of the interferometric fringe.

Desirably, the first single-mode optical fiber and the second single-mode optical fiber are fixed to the capillary quartz-glass tube by epoxy adhesive.

A method to measure strain with the transmission-type extrinsic Fabry-Perot interferometric optical fiber sensor includes steps of: attaching the transmission-type extrinsic Fabry-Perot interferometric optical fiber sensor to object to be measured; obtaining number of peaks and valleys during transformation of the object, the neighboring peak and valley being half wavelength of the interferometric fringe; determining transformation direction of the capillary quartz-glass tube on the basis of sign of signal-level change, signal level being middle value between peak and valley of the interferometric fringe; and calculating strain by applying resolution and the number of peaks and valleys to following mathematical equation.

$$\varepsilon = \left(\frac{\lambda}{4L_{gauge}}\right) \cdot n$$

$\lambda/4L_{gauge}$: resolution of optical fiber sensor n: number of peaks and valleys observed at output signal Desirably, the step of determining transformation direction of the capillary quartz-glass tube determines that the capillary quartz-glass tube is transformed in compressible direction if sign of signal-level change is positive. The step of determining transformation direction of the capillary quartz-glass tube determines that the capillary quartz-glass tube is transformed in tensile direction if sign of signal-level change is negative.

A method to measure temperature with a transmission-type extrinsic Fabry-Perot interferometric optical fiber sensor includes steps of: attaching the transmission-type extrinsic Fabry-Perot interferometric optical fiber sensor to object to be measured; obtaining number of peaks and valleys during transformation of the object, the neighboring peak and valley being half wavelength of the interferometric fringe; determining if temperature increases or decreases on the basis of sign of signal-level change, signal level being middle value between peak and valley of the interferometric fringe; and calculating temperature change by applying thermal expansion coefficient of the capillary quartz-glass tube, thermal expansion coefficient of the epoxy, thermal expansion coefficient of the object, and the number of peaks and valleys to following mathematical equation.

$$\Delta T = \left[\frac{\lambda}{4L_{gauge}}(\alpha_H - \alpha_T - \alpha_F)\right] \cdot n$$

$\alpha_T$: thermal expansion coefficient of the capillary quartz-glass glass tube $\alpha_E$: thermal expansion coefficient of the epoxy $\alpha_H$: thermal expansion coefficient of the object n: number of peaks and valleys

BRIEF DESCRIPTION OF THE DRAWINGS

The embodiments of the present invention will be explained with reference to the accompanying drawings, in which.

DETAILED DESCRIPTION OF THE INVENTION

Intensity loss is occurred by light spreading when light propagates from optical fiber to air.

Figure 1:
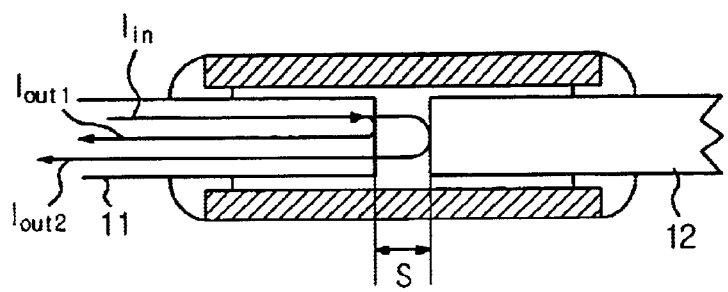
FIG. 1 is a diagram illustrating internal structure of conventional extrinsic Fabry-Perot optical sensor.
Figure 2:
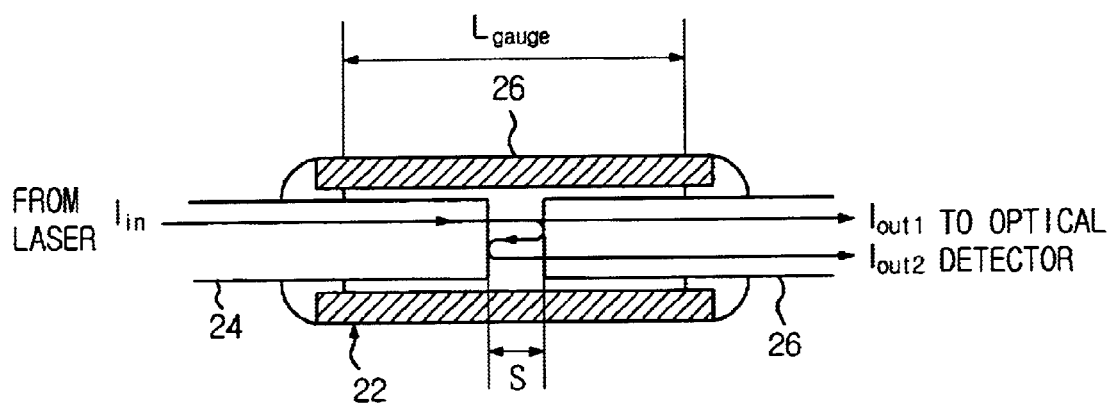
FIG. 2 is a diagram illustrating internal structure of a transmission-type extrinsic Fabry-Perot optical sensor in accordance with an embodiment of the present invention.

FIG. 2 is a diagram illustrating internal structure of a transmission-type extrinsic Fabry-Perot optical sensor in accordance with an embodiment of the present invention.

The transmission-type extrinsic Fabry-Perot optical sensor shown in FIG. 2 includes a first single-mode optical fiber 24, a capillary glass tube 25, a second single-mode optical fiber 26, and optical detector. Light from laser is launched to the first single-mode optical fiber 24. The first single-mode optical fiber 24 is inserted into and fixed to one end of the capillary glass tube 25. The second single-mode optical fiber 26 is inserted into and fixed to the other end of the capillary glass tube 25. There is a gap between the first single-mode optical fiber 24 and the second single-mode optical fiber 26 with gap length. The light is launched to the second single-mode optical fiber 26 through the first single-mode optical fiber 24 and air gap. The optical detector detects the light propagated from the second single-mode optical fiber 26.

Ends of the first single-mode optical fiber 24 and the second single-mode optical fiber 26 connected with the capillary glass tube 25 are cut with perpendicular to direction of the light. The light propagates through the first single-mode optical fiber 24, air gap, and the second single-mode optical fiber 26. A part of the light launched from the first single-mode optical fiber 24 directly propagates into the optical detector through the second single-mode optical fiber 26 after passing the air gap. Another part of the light launched from the first single-mode optical fiber 24 is reflected in the end of the second single-mode optical fiber 26 and reflected again in the end of the first single-mode optical fiber 24. Then the part of the light propagates into the optical detector through the second single-mode optical fiber 26. Consequently, there are two optical paths.

Due to path difference (2s) of the two optical paths, interferometric fringe is occurred and it is detected at the optical detector. This effect is described in detail at "Interference Effects in Optical Fiber Connection", Applied optics, Wagner, R. E., and Sandahl, C. R., Vol. 21, No. 8, pp. 1381~1385, 1982.

In addition, signal level of output intensity is varied due to intensity loss caused when light is passing through air gap. The intensity loss is described in detail at "Loss Analysis of Single-Mode fiber splices", The bell system technical journal, Marcuse, D., Vol. 56, No. 5, pp. 703~718, 1977.

The capillary glass tube of the transmission-type extrinsic Fabry-Perot interferometric optical fiber sensor is attached on the surface of objects to be measured or is inserted into the objects. If the objects are transformed by external force, the transformation is transferred to the capillary glass tube. Then, the capillary tube is transformed and gap length is changed. The change of the gap length can be measured by resolution of a quarter of light source's wavelength.

Figure 3:
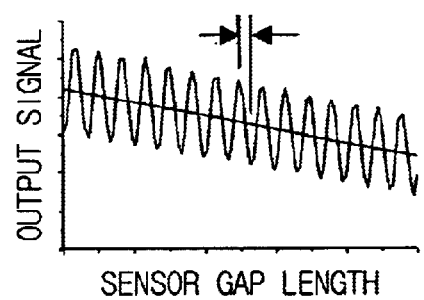
FIG. 3 is a graph illustrating output signal of a transmission-type extrinsic Fabry-Perot optical sensor in accordance with an embodiment of the present invention.

FIG. 3 is a graph illustrating output signal of an extrinsic Fabry-Perot optical sensor in accordance with an embodiment of the present invention. Interferometric fringe with constant wavelength is generated by change of gap length. If objects to be measured are transformed in tensile direction, the gap length is increased. Therefore, intensity loss caused by this is increased and level of optical signal is linearly decreased. If objects to be measured are transformed in compressible direction, the gap length is decreased. Therefore, intensity loss caused by this is decreased and level of optical signal is decreased. The transformation direction and magnitude of the objects can be measured by the interferometric fringe and the trend of optical signals.

Marcuse analyzed intensity loss caused between two single-mode fibers using Gaussian approximation and overlap integral method. The result can be applied to analyze output signal of the transmission-type extrinsic Fabry-Perot interferometric optical fiber sensor.

Coupling efficiency η(s) between the two optical fibers is expressed in equation 3.

$$\eta(s) = \frac{1}{1 + (0.5s/x_R)^2} \quad \text{[Equation 3]}$$

XR: Rayleigh distance
s: gap length
The output signal of optical fiber sensor can be expressed as following equation 4.

$$T(s) = t_1^2 t_2^2 \left[ \frac{1}{1 + (0.5s/x_R)^2} + \frac{r^4}{1 + (0.5 \cdot 3s/x_R)^2} + \frac{2r^2}{\sqrt{\{1 + (0.5s/x_R)^2\}\{1 + (0.5 \cdot 3s/x_R)^2\}}} \cos(2ks) \right] \quad \text{[Equation 4]}$$

Figure 4:
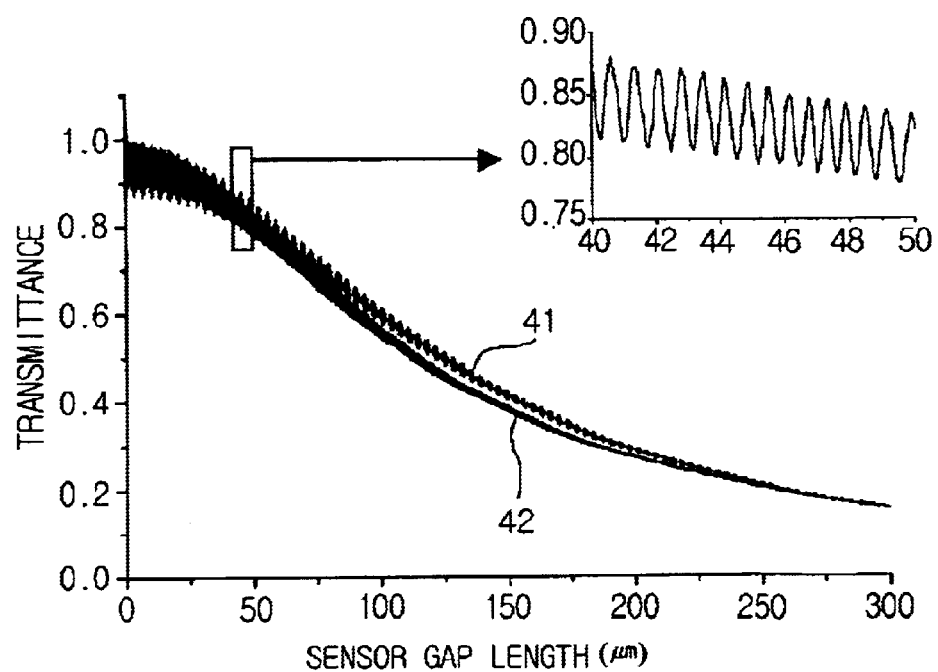
FIG. 4 is a graph illustrating experimental result of output signal transmittance with respect to length of a sensor.

$T(s)$: transmittance = $\frac{\text{light intensity without intensity loss}}{\text{light intensity with intensity loss}}$ $t_1$: transmission coefficient when light propagates from optical fiber to air
$t_2$: transmission coefficient when light propagates from air to optical fiber
r: reflection coefficient FIG. 4 is a graph illustrating experimental result of output signal transmittance with respect to gap length of a sensor. Laser diode of 1315 nm wavelength is used as light source and axes of two single-mode fibers are aligned for the experiment. The core diameter of the single-mode fibers is 7.9 μm. It is shown that the result of analysis 41 is similar to the result of experiment in FIG. 4. In addition, it is found that amplitude of interferometric fringe and variance of optical signal level are large when gap length is in range from 58 μm to 88 μm. The optical signal level is the middle value of peak value and valley value of the interferometric fringe. Consequently, the measurement is efficient when gap length of the sensor is between 58 μm and 88 μm.

In the optical fiber sensor shown in FIG. 2, $L_{gauge}$ is gauge length, which is critical to detect transformation of objects to be measured. Gauge length is related with gap length (s) and parts of single-mode optical fibers 24, 26 that are not fixed in capillary glass tube. Strain (ε) of the objects can be expressed as following equation 5.

$$\varepsilon = \left( \frac{\lambda}{4L_{gauge}} \right) \cdot n \quad \text{[Equation 5]}$$

n: number of peaks and valleys observed at output signal
In the equation, $\lambda/4L_{gauge}$ is resolution of optical fiber sensor. As gauge length ($L_{gauge}$) gets increased, $\lambda/4L_{gauge}$ gets decreased.

Figure 5:
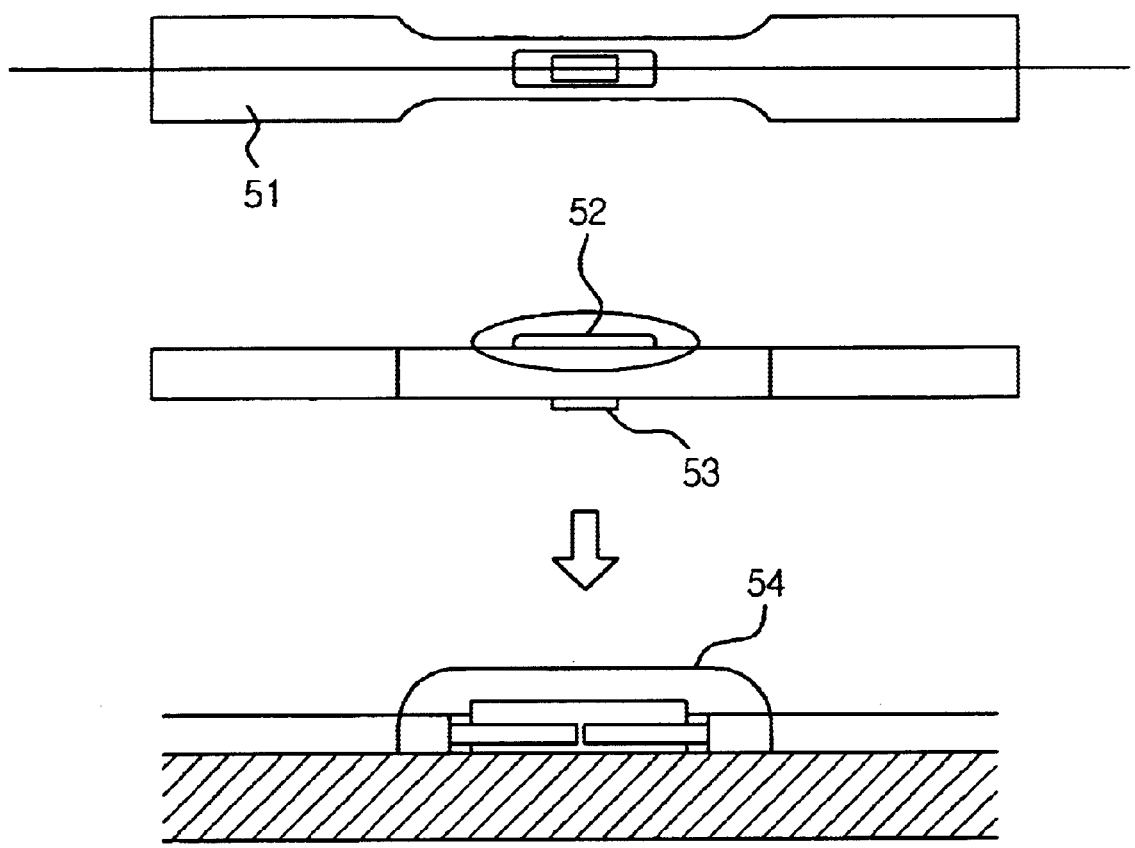
FIG. 5 is a diagram illustrating attachment of a sensor on surface of test specimen.

FIG. 5 is a diagram illustrating attachment of a sensor on surface of test specimen. Aluminum alloy specimen 51 is the object to be measured and an optical fiber sensor 51 is attached on the surface of the aluminum alloy specimen 51 for tension test. The result of the tension test is compared with an experiment with commercial resistance type strain gauge 53. Specification of the optical fiber sensor for the experiment is as follows.

| | |
|---|---|
| Jacket diameter | 250 μm |
| Cladding diameter | 125 μm |
| Core diameter | 7.9 μm |
| Numerical aperture (NA) | 0.1 |
| External diameter of quartz-glass capillary tube | 300 μm |
| Internal diameter of quartz-glass capillary tube | 130 μm |

The single-mode fibers is fixed to the capillary tube by epoxy adhesive 54. The optical fiber sensor 52 and the strain gauge 54 are attached at the same position of different sides of the alloy specimen.

Laser diode of 1315 nm wavelength is used as a light source. Load on the alloy specimen 51 has a form of triangular wave, which is generated by MTS. The minimum load is zero and the load is repeatedly applied in tensile direction.

Figure 6:
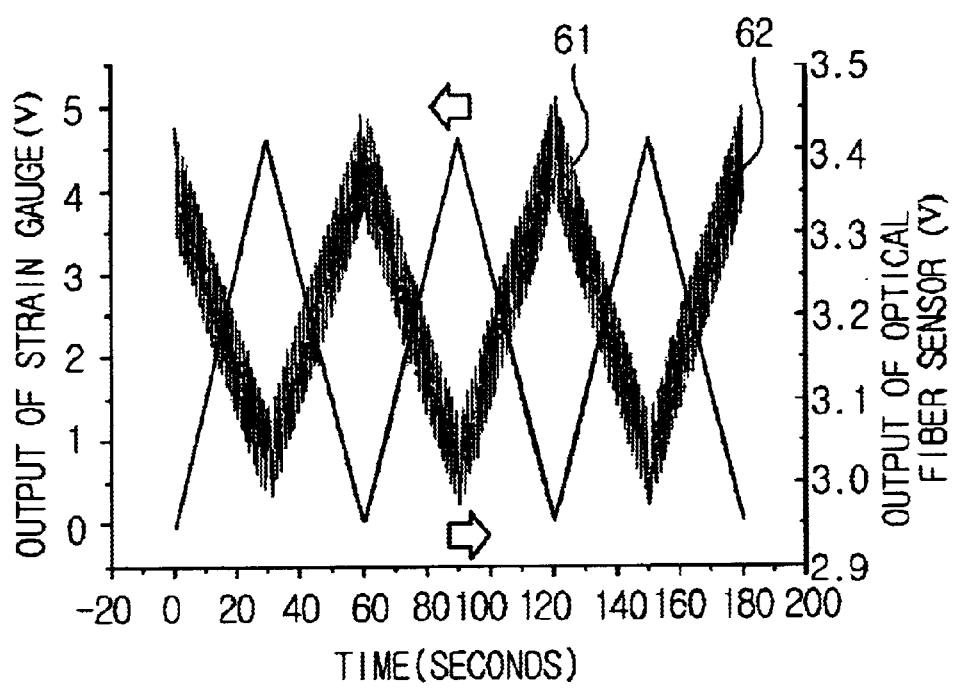
FIG. 6 is a graph illustrating comparison between output of a transmission-type extrinsic Fabry-Perot interferometric optical fiber sensor and output of a strain gauge.

FIG. 6 is a graph illustrating comparison between output of a transmission-type extrinsic Fabry-Perot interferometric optical fiber sensor and output of a strain gauge. When comparing with the output signal of the strain gauge, the output signal of the optical fiber sensor has interferometric fringe in response to transformation. Also, signal level decreases in tensile direction and increases in compressible direction.

Figure 7:
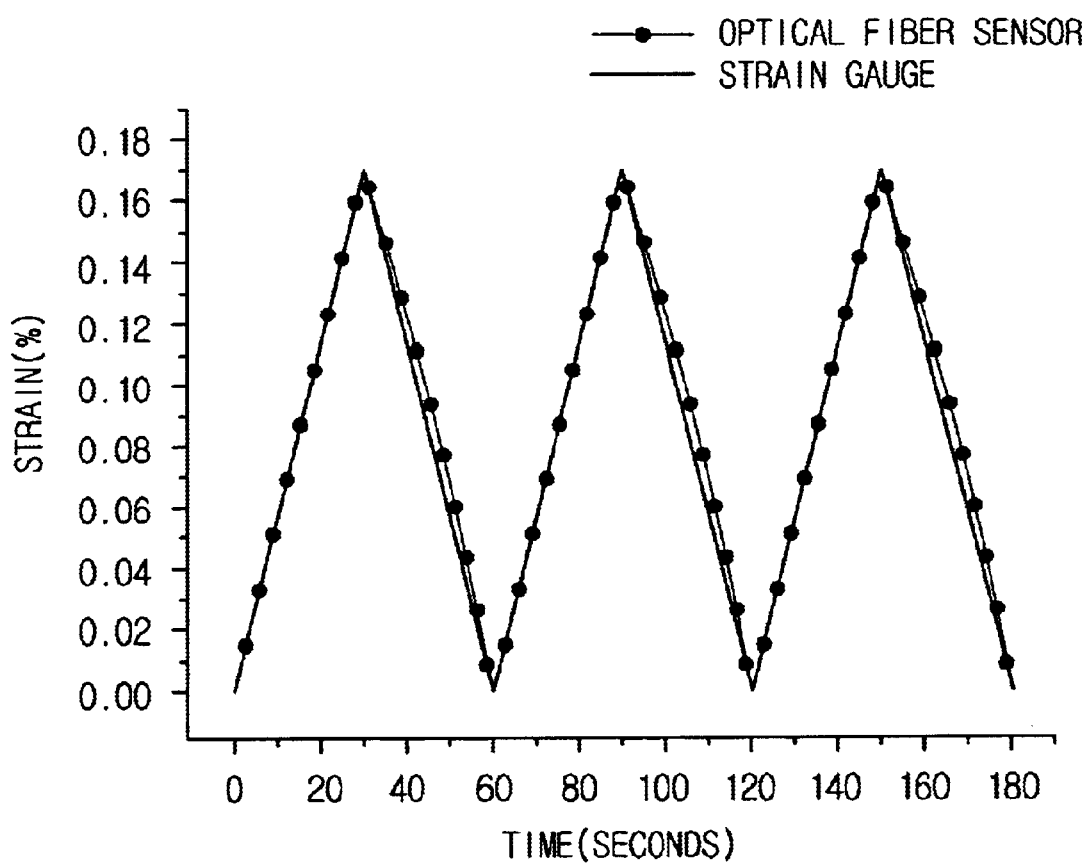
FIG. 7 is a graph illustrating strain measured by a transmission-type extrinsic Fabry-Perot interferometric optical fiber sensor.

FIG. 7 is a graph illustrating strain measured by a transmission-type extrinsic Fabry-Perot interferometric optical fiber sensor. In FIG. 7, it is shown that the measurement of the transmission-type extrinsic Fabry-Perot interferometric optical fiber sensor is agreed with the measurement of commercial strain gauge. Generally, the number of peaks and valleys is used to determine strain.

Power reflection factor at cut surface of the optical fiber is 0.035 and finesse is small. Therefore, output signal of the sensor is close to the sine wave and the phase of interferometric fringe is discriminated. Resolution can be increased.

$$\Phi = \frac{\pi R}{1 - R^2} \quad \text{[Equation 6]}$$

Equation 6 defines finesse and equation 7 defines compensation of thermal expansion caused by temperature change in measuring strain. That is, strain of the optical fiber sensor attached on the surface of the object and phase change in response to temperature change are described in equation 7.

$$\Delta\phi = \left(\frac{\partial\phi}{\partial\sigma}\right)_T \Delta\sigma + \left(\frac{\partial\phi}{\partial T}\right)_\sigma \Delta T \quad \text{[Equation 7]}$$

φ: phase, φ=2 ks
s: gap length

Following equation 8 expresses phase change when size of the optical fiber sensor is much smaller than size of the object to be measured and when gap length (s) is much smaller than gauge length ($L_{gauge}$). Strain caused by temperature change and external load is also described in equation 8.

$$\Delta\phi = 2kL_{gauge}(\alpha\Delta T + \Delta\varepsilon_{stress}) \quad \text{[Equation 8]}$$

$$\alpha\Delta T + \Delta\varepsilon_{stress} = \left(\frac{\lambda}{4L_{gauge}}\right) \cdot n$$

k: propagation constant 2 π/λ
n: number of peaks and valleys occurred in transformation range of objects
α: thermal expansion coefficient
$\Delta\varepsilon_{stress}$: strain by external load Thermal expansion coefficient of object to be measured, α is bigger than thermal expansion coefficient of capillary glass tube 25 and thermal expansion coefficient of single-mode fibers 24, 26. Strain by external load, $\Delta\varepsilon_{stress}$, can be used for temperature compensation if temperature change can be measured separately or if additional optical fiber sensor can be used under the same condition as object to be measured without external load.

The transmission-type extrinsic Fabry-Perot interferometric optical fiber sensor in accordance with the present invention is able to measure physical quantity like strain using gap length change. In addition, the transmission-type extrinsic Fabry-Perot interferometric optical fiber sensor is able to measure temperature change by detecting thermal expansion caused by temperature change of objects to be measured where external load and thermal stress are not applied.

Figure 8:
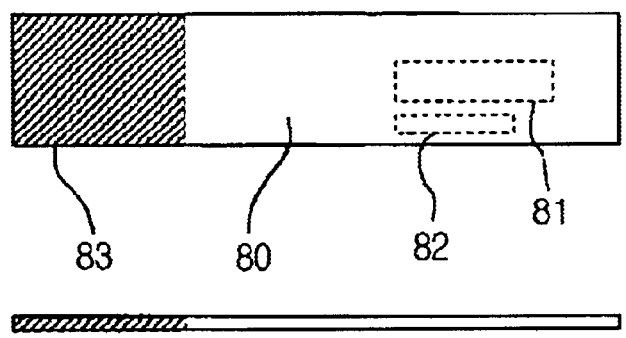
FIG. 8 is a diagram illustrating experimental setup for measuring temperature with an optical fiber sensor in accordance with the present invention.

FIG. 8 is a diagram illustrating experimental setup for measuring temperature with an optical fiber sensor in accordance with the present invention. Temperature change is calculated with the help of equation 8. As shown in FIG. 8, optical fiber sensor is attached on the structure that isn't transformed by external load. Thermocouple 82 is attached on one surface of cantilever beam structure 80 for comparing temperature measurement results of optical fiber sensor 81. The cantilever beam structure 80 is made of aluminum alloy material. Gripping device fixes the cantilever beam structure 80 at the part 83 of the beam 80.

Figure 9:
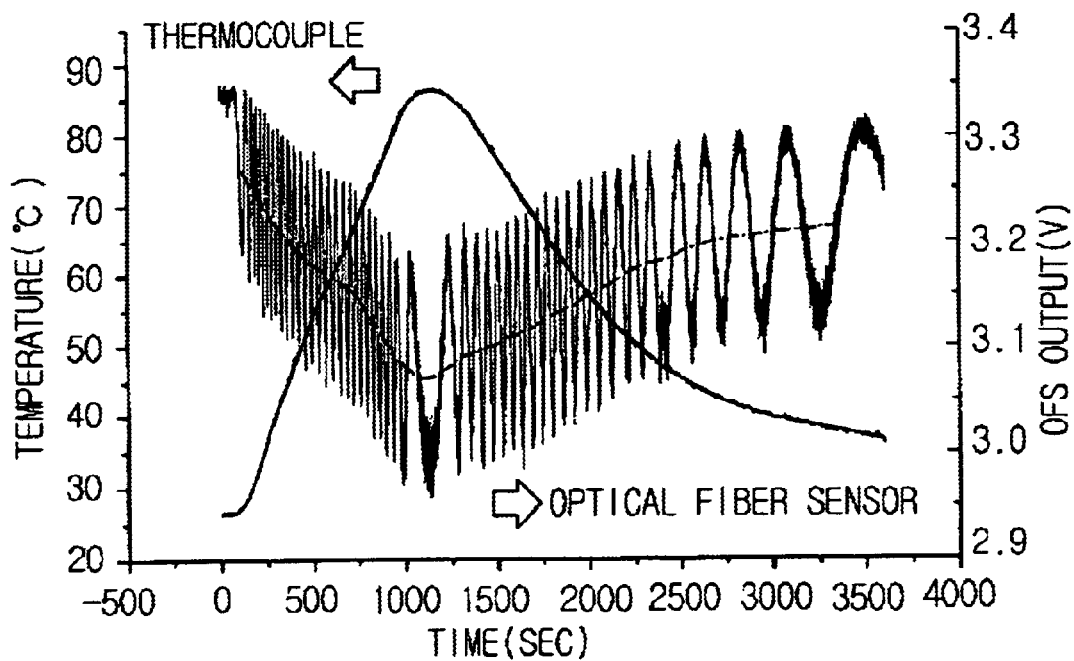
FIG. 9 is a graph illustrating output of a thermocouple and the optical fiber sensor in FIG. 8.

The temperature measurement structure 80 has been heated at 80° C. for 15 minutes and then gets cooled. At the moment, output signals from the optical fiber sensor and the thermocouple are observed. FIG. 9 is a graph illustrating output of a thermocouple and the optical fiber sensor in FIG. 8. As temperature increases, the optical fiber sensor generates interferometric fringe in the trend of decreasing signal level. As temperature decreases, the optical fiber sensor generates interferometric fringe in the trend of increasing signal level.

Figure 10:
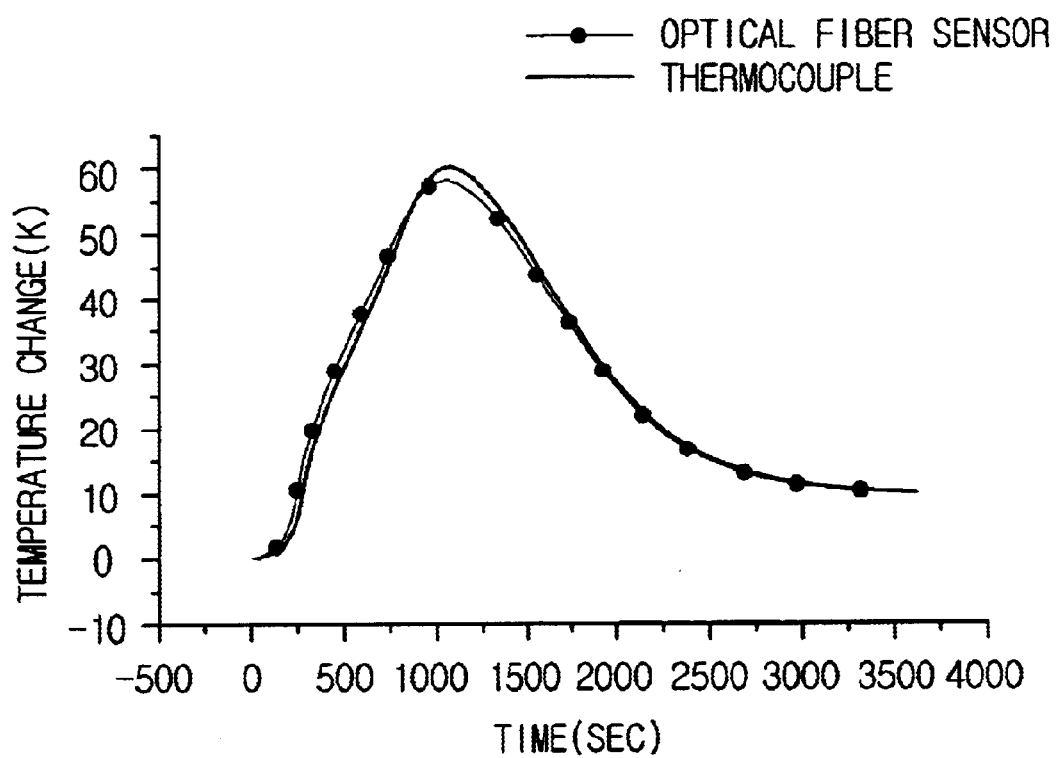
FIG. 10 is a graph illustrating comparison between temperature measured by the thermocouple and by the optical fiber sensor after the output of the optical fiber sensor is processed.

FIG. 10 is a graph illustrating comparison between output of the thermocouple and output of the optical fiber sensor after the output of the optical fiber sensor is converted into temperature change.

The transmission-type extrinsic Fabry-Perot interferometric optical fiber sensor in accordance with the present invention measures magnitude of temperature change by counting number of interferometric fringe, which is occurred in response to change of gap length caused by transformation of objects to be measured. Also, the transmission-type extrinsic Fabry-Perot interferometric optical fiber sensor is able to distinguish the direction of temperature change by observing increase or decrease of signal level, which is related to intensity loss. The intensity loss is caused by light spreading.

In addition, since signal level changes linearly in response to gap length in measuring transformation magnitude of objects to be measured with the transmission-type extrinsic Fabry-Perot interferometric optical fiber sensor, signal level of output signal can be used in absolute measurement by this linear relation between signal level and measuring quantity.

In addition, since the transmission-type extrinsic Fabry-Perot interferometric optical fiber sensor in accordance with the present invention is able to measure the direction of transformation, big structures such as buildings and bridges can be monitored efficiently. Also, the optical fiber sensor is useful for monitoring fatigue damage caused by long time usage. Absolute measurement can be applied for cases in which continuous measurement is not possible. In those cases, reference value is determined and then relative measurement is performed. Accordingly, the optical fiber sensor is useful for non-continuous monitoring.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. A transmission-type extrinsic Fabry-Perot interferometric optical fiber sensor comprising:

a first single-mode optical fiber and a second single-mode optical fiber, the first single-mode optical fiber inserted into one end of a capillary quartz-glass tube and the second single-mode optical fiber inserted into the other end of the capillary quartz-glass tube, ends of the first single-mode optical fiber and the second single-mode optical fiber being perpendicular to the direction of the optical fibers, an air gap formed between the first single-mode optical fiber and the second single-mode optical fiber in the capillary quartz-glass tube, a gap length of the air gap varying in response to a transformation of the capillary quartz-glass tube attached to an object to be measured;

a laser device for launching light into the first single-mode optical fiber; and an optical detector for detecting an occurrence of interferometric fringes of the light, having passed through the first single-mode optical fiber, the air gap, and the second single-mode optical fiber, and for monitoring the number of occurrences of the interferometric fringes and a slope sign of a series of signal levels, said signal level being a defined signal with data at a middle position between neighboring peaks and valleys of the occurring interferometric fringes, so that a magnitude and a direction of the transformation of the object could be determined on the basis of the number of occurrences of the interferometric fringes and the slope sign, respectively.

2. The transmission-type extrinsic Fabry-Perot interferometric optical fiber sensor according to claim 1, wherein it is determined that the gap length is decreased and thus the object is transformed by compression in a length direction when the slope sign is positive and that the gap length is increased and the thus the object is transformed by tension in a length direction, when the slope sign is negative.

3. The transmission-type extrinsic Fabry-Perot interferometric optical fiber sensor according to claim 1, wherein the first single-mode optical fiber and the second single-mode optical fiber are fixed to ends of the capillary quartz-glass tube by an epoxy adhesive.

4. A method for measuring a strain with a transmission-type extrinsic Fabry-Perot interferometric optical fiber sensor, the transmission-type extrinsic Fabry-Perot interferometric optical fiber sensor having a first single-mode optical fiber and a second single-mode optical fiber, the first single-mode optical fiber inserted into one end of a capillary quartz-glass tube and the second single-mode optical fiber inserted into the other end of the capillary quartz-glass tube, ends of the first single-mode optical fiber and the second single-mode optical fiber being perpendicular to the direction of the optical fibers, an air gap formed between the first single-mode optical fiber and the second single-mode optical fiber in the capillary quartz-glass tube, a gap length of the air gap varying in response to a transformation of the capillary quartz-glass tube, a laser device for launching a light into the first single-mode optical fiber, and an optical detector for detecting an occurrence of interferometric fringes of the light, having passed through the first single-mode optical fiber, the air gap, and the second single-mode optical fiber, and for monitoring the number of occurrences of the interferometric fringes and a slope sign of a series of signal levels, the signal level being a defined signal with data at a middle position between neighboring peaks and valleys of the occurring interferometric fringes, comprising the steps of:

attaching the transmission-type extrinsic Fabry-Perot interferometric optical fiber sensor to an object to be measured;

detecting an occurrence of interferometric fringes of the light transmitted through the second single-mode optical fiber to the optical detector;

obtaining number of peaks and valleys of the interferometric fringes when the occurrence of interferometric fringes is detected;

determining a transformation direction of the object on the basis of the slope sign;

calculating the strain of the object; and wherein the step of determining the transformation direction of the object includes determining that the object is transformed by compression in a length direction if the slope sign is positive and that the object is transformed by tension in a length direction if the slope sign is negative.

5. The method for measuring the strain according to claim 4, wherein, a strain($\epsilon$) of the object is calculated by applying a resolution and the number of peaks and valleys to the following mathematical equation:

$$\varepsilon = \left(\frac{\lambda}{4L_{gauge}}\right) \cdot n$$

$\lambda/4L_{gauge}$ resolution of optical fiber sensor $\lambda$: wavelength of the light $L_{gauge}$ : gauge length of the sensor n: number of peaks and valleys observed at output signal.

6. A method for measuring a temperature with a transmission-type extrinsic Fabry-Perot interferometric optical fiber sensor, the transmission-type extrinsic Fabry-Perot interferometric optical fiber sensor having a first single-mode optical fiber and a second single-mode optical fiber, the first single-mode optical fiber inserted into one end of a capillary quartz-glass tube and the second single-mode optical fiber inserted into the other end of the capillary quartz-glass tube, ends of the first single-mode optical fiber and the second single-mode optical fiber being perpendicular to the direction of the optical fibers, an air gap formed between the first single-mode optical fiber and the second single-mode optical fiber in the capillary quartz-glass tube, a gap length of the air gap varying in response to a transformation of the capillary quartz-glass tube, a laser device for supplying light into an end of the first single-mode optical fiber, and an optical detector for detecting an occurrence oft interferometric fringes of the light, having passed through the first single-mode optical fiber, the air gap; and the second single-mode optical fiber, and for monitoring the number of occurrences of the interferometric fringes and slope sign of a series of signal levels, the signal level being a defined value corresponding to a middle position between neighboring peaks and valleys of the occurring interferometric fringes, comprising the steps of:

attaching the transmission-type extrinsic Fabry-Perot interferometric optical fiber sensor to an object to be measured;

detecting occurrence of interferometric fringes of the light transmitted through the second single-mode optical fiber to the optical detector;

obtaining number of peaks and valleys of the interferometric fringes when the occurrence of interferometric fringe is detected;

determining if the temperature increases or decreases on the basis of the slope sign, wherein, the temperature change of the object being determined that the temperature of the object is increased if the slope sign is positive and that the temperature of the object is decreased if the slope sign is negative; and calculating a temperature change (ΔT) by applying a thermal expansion coefficient of the capillary quartz-glass tube, thermal expansion coefficient of the optical fiber, a thermal expansion coefficient of the object, and the number of peaks and valleys to the following mathematical equation:

$$\Delta T = \left[ \frac{\lambda}{4L_{gauge}} (\alpha_H - \alpha_T - \alpha_F) \right] \cdot n$$

$\alpha_T$: thermal expansion coefficient of the capillary quartz-glass tube
$\lambda_E$: wavelength of the light
$\alpha_H$: thermal expansion coefficient of the object
$L_{gauge}$: gauge length of the sensor
$\alpha_F$: thermal expansion coefficient of the optical fiber
n: number of peaks and valleys.

* * * * *

UNITED STATES PATENT AND TRADEMARK OFFICE
CERTIFICATE OF CORRECTION

PATENT NO. : 6,687,011 B1
DATED : February 3, 2004
INVENTOR(S) : Jung Ju Lee et al.

It is certified that error appears in the above-identified patent and that said Letters Patent is hereby corrected as shown below:

Column 9,
Line 36, "the" should be deleted between "and" and "thus"

Column 10,
Line 29, insert a colon -- : -- following "Lambda/4Lgauge"
Line 49, delete "an end of"
Line 51, change the word "off" to the word -- of -- and remove the comma following "light"
Line 53, delete the comma following the word "gap"

Column 12,
Line 8, delete the entire line
Line 10, delete the entire line

Signed and Sealed this

Eighteenth Day of May, 2004

JON W. DUDAS
*Acting Director of the United States Patent and Trademark Office*